United States Patent
Mochizuki et al.

[11] Patent Number: 5,958,308
[45] Date of Patent: Sep. 28, 1999

[54] COOLING TOWER

[75] Inventors: Kesaaki Mochizuki, Kukisaki-machi; Osamu Goto, Ushiku; Katsutoshi Shibata, Kawaguchi, all of Japan

[73] Assignee: Ishikawajima-Harima Jukogyo Kabushiki Kaisha, Tokyo, Japan

[21] Appl. No.: 09/020,893

[22] Filed: Feb. 9, 1998

[30] Foreign Application Priority Data

Nov. 7, 1997 [JP] Japan ................................. 9-305491

[51] Int. Cl.⁶ ............................... B01F 3/04; F28F 27/02
[52] U.S. Cl. .................... 261/153; 165/100; 165/900; 261/112.2; 261/DIG. 77
[58] Field of Search .................. 261/111, 112.1, 261/112.2, 153, DIG. 11, DIG. 77; 165/100, 101, 115, 900

[56] References Cited

U.S. PATENT DOCUMENTS

| | | | |
|---|---|---|---|
| 4,623,494 | 11/1986 | Gautier et al. | 261/DIG. 77 |
| 5,468,426 | 11/1995 | Kato | 261/112.1 |
| 5,505,882 | 4/1996 | Kato | 261/112.1 |
| 5,505,883 | 4/1996 | Kato | 261/153 |
| 5,695,006 | 12/1997 | Usui et al. | 261/153 |
| 5,775,409 | 7/1998 | Goto et al. | 261/DIG. 77 |
| 5,800,743 | 9/1998 | Usui et al. | 261/DIG. 77 |

FOREIGN PATENT DOCUMENTS 9-72691  3/1997  Japan .
9-126667  5/1997  Japan .

Primary Examiner—C. Scott Bushey
Attorney, Agent, or Firm—Oblon, Spivak, McClelland, Maier & Neustadt, P.C.

[57] ABSTRACT

Hot water is sprayed to fillers arranged immediately under a hot water vessel through spray ports opened on a lower surface of the hot water vessel. The hot water flowing down along the fillers is cooled through direct contact with ambient air. The cooling tower includes fillers partitioned alternately into permanent wet and wet-dry changeover regions which are mutually isolated for flow passages of the ambient air and spray pipes provided on the lower surface of the hot water vessel exclusively for the wet-dry changeover regions such that the hot water can be sprayed to the wet-dry changeover regions separately from the permanent wet regions. The hot water vessel is supported by the spray pipes. The spray ports of the hot water vessel is communicated only with the permanent wet regions.

4 Claims, 5 Drawing Sheets

COOLING TOWER

BACKGROUND OF THE INVENTION

The present invention relates to a cooling tower.

FIG. 1 exemplarily shows a conventional cooling tower, which comprises an outlet 3 with an axial flow fan 2 at a top of a casing 1, air inlets 4 at an outer periphery of the casing 1, a hot water vessel 5 at an upper portion of the casing 1 and surrounding the outlet 3, and a heat exchanger 9 below the hot water vessel 5 in which hot water 7 is sprayed through spray ports 6 on a lower surface of the vessel 5 and is heat-exchanged with ambient air 8 sucked through the air inlets 4 by the fan 2. The heat exchanger 9 comprises a dry type air heater 11 in the form of finned tubes 10 immediately below the vessel 5 and fillers 12 in the form of a number of heat transfer surface members with irregular surfaces, made of sheet-like synthetic resin and arranged in parallel with each other to define flow passages for the ambient air 8.

In FIG. 1, reference numeral 13 denotes a bottom water vessel to recover the cooled water.

With the cooling tower of the type described above, the hot water 7 in the vessel 5 flows down through the ports 6 and tubes 10 and passes along the fillers 12 underneath while the ambient air 8 is sucked through the inlets 4 by the fan 2 and is directed to flow transversely of the heater 11 and fillers 12, thereby cooling the water 7.

In this case, the hot water 7 flowing down along the fillers 12 is effectively cooled through direct heat exchange with the ambient air 8. The air 8 having been heat-exchanged with the water 7 at the fillers 12 becomes wet air 14 which is high in temperature and has a moisture content of substantially 100%. If the wet air 14 were directly discharged out of the cooling tower, it would become white smoke when the ambient temperature is low.

Such white smoke will be abhorred by the neighborhood since it seems as if the white smoke would contaminate their environment. Moreover, there is a fear that visibility may be adversely affected by the white smoke coming down near a ground surface and staying there as fog. Thus, there has been strong demands to prevent the generation of white smoke.

To this end, in the cooling tower as shown in FIG. 1 with the hot water 7 flowing down through the tubes 10, the ambient air 8 flowing along outer peripheries of the tubes 10 is heated in dry manner into dry air 15 having an extremely low moisture content. The dry air 15 is mixed with the wet air 14 by the fan 2 to reduce the moisture content of the air to be discharged through the outlet 3, thereby preventing the white smoke being generated.

Such a cooling tower, which is provided with the special-purpose dry type air heater 11 in the form of the finned tubes 10 exclusively for generating the dry air 15 to prevent the white smoke from being generated, is much complicated in structure and extremely expensive in production cost. Because of indirect heat exchange with the finned tubes 10, the heat exchange efficiency cannot be satisfactorily enhanced and in compensation therefore a high volume or capacity is required. This means that the dry type air heater 11 must be larger in size, which leads to increase in height and thus in total dimensions of the cooling tower.

The present invention was made in view of the above and has for its object to reduce cost for construction of and make compact in size a cooling tower which is capable of preventing white smoke from being generated.

BRIEF SUMMARY OF THE INVENTION

The present invention is directed to a cooling tower wherein hot water is sprayed to fillers arranged immediately under a hot water vessel through spray ports opened on a lower surface of the hot water vessel, the hot water flowing down along the fillers being cooled through direct contact with ambient air, said cooling tower comprising said fillers partitioned alternately into permanent wet and wet-dry changeover regions which are mutually isolated for flow passages of the ambient air and spray pipes provided on the lower surface of the hot water vessel exclusively for the wet-dry changeover regions such that the hot water can be sprayed to the wet-dry changeover regions separately from the permanent wet regions, said hot water vessel being supported by said spray pipes, said spray ports of the hot water vessel being communicated only with the permanent wet regions.

When there is no possibility of white smoke being generated (i.e., when ambient air temperature is high), the hot water is supplied to both of the hot water vessel and the spray pipes, so that the hot water is sprayed to the permanent wet regions of the fillers through the spray ports on the lower surface of the hot water vessel and is also sprayed to the wet-dry changeover regions of the fillers through the spray pipes. As a result, the hot water is effectively direct-cooled by the ambient air over the entire regions of the fillers because of the water being sprayed to both of the permanent wet and wet-dry changeover regions.

On the other hand, when white smoke may be generated (i.e., when ambient air temperature is low), the supply of the water to the spray pipes is ceased into two concurrent operations, i.e., direct cooling of the hot water by the ambient air in the permanent wet regions where the hot water is sprayed and dry heating of the ambient air passing through the wet-dry changeover regions where no hot water is sprayed. The wet air generated by the direct cooling is mixed with the dry air produced by the dry heating to thereby prevent white smoke from being generated.

Thus, there is no need of providing a special-purpose dry type air heater in the form of finned tubes since the fillers are partly used as the wet-dry changeover regions. Also, there is no need of providing support members for the hot water vessel since the latter is supported by the spray pipes.

Preferably, the spray pipes have vertically elongate rectangular cross-section, which facilitates easy application of the spray pipes to the wet-dry changeover regions which are normally narrow in width in comparison with the permanent wet regions. The feature is particularly advantageous in that the wet-dry changeover regions are readily isolated from the permanent wet regions by extending upper ends of the fillers which define the wet-dry changeover regions upward along opposite side surfaces of the spray pipes. Moreover, in utilization of the spray pipes as supports for the hot water vessel, that feature increases structural strength of the supports against the load placed thereon and enhances reliability as the supports.

Preferably, the spray pipes are communicated with a common auxiliary water vessel which is arranged adjacent to the hot water vessel and extends transversely of the spray pipes. This makes it possible to substantially evenly distribute the hot water temporarily pooled in the auxiliary water vessel to each of the spray pipes all the way to the depth, so that the water can be evenly and satisfactorily sprayed in the wet-dry changeover regions of the fillers.

The present invention will become more apparent from the following description of a preferred embodiment thereof taken in conjunction with the accompanying drawings.

DETAILED DESCRIPTION OF THE PREFERRED EMBODIMENT

Figure 1:
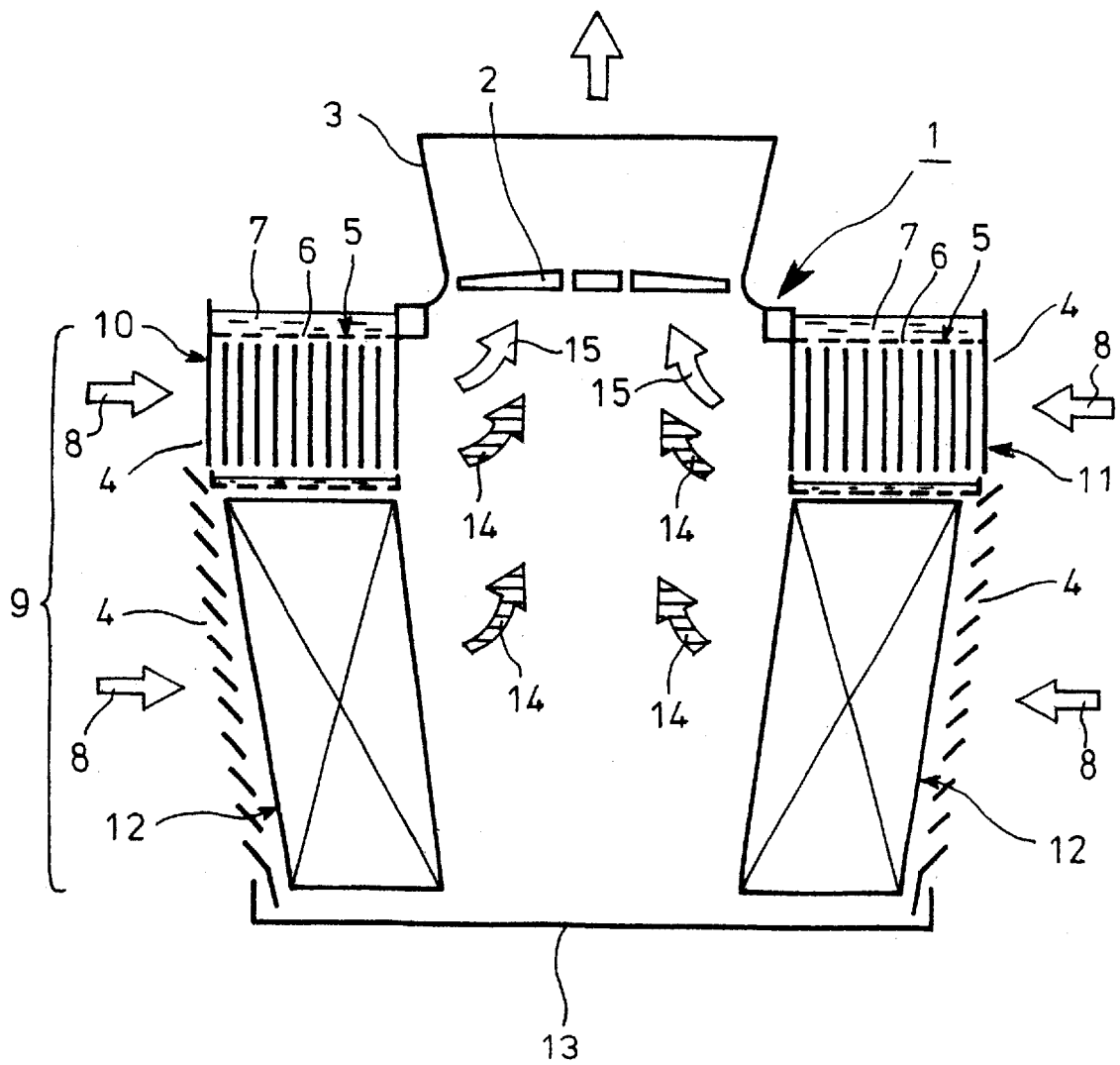
FIG. 1 is a schematic illustration of a conventional cooling tower.

FIGS. 2 to 5 represent an embodiment of the present invention in which the same components as in FIG. 1 are referred to by the same reference numerals.

Figure 2:
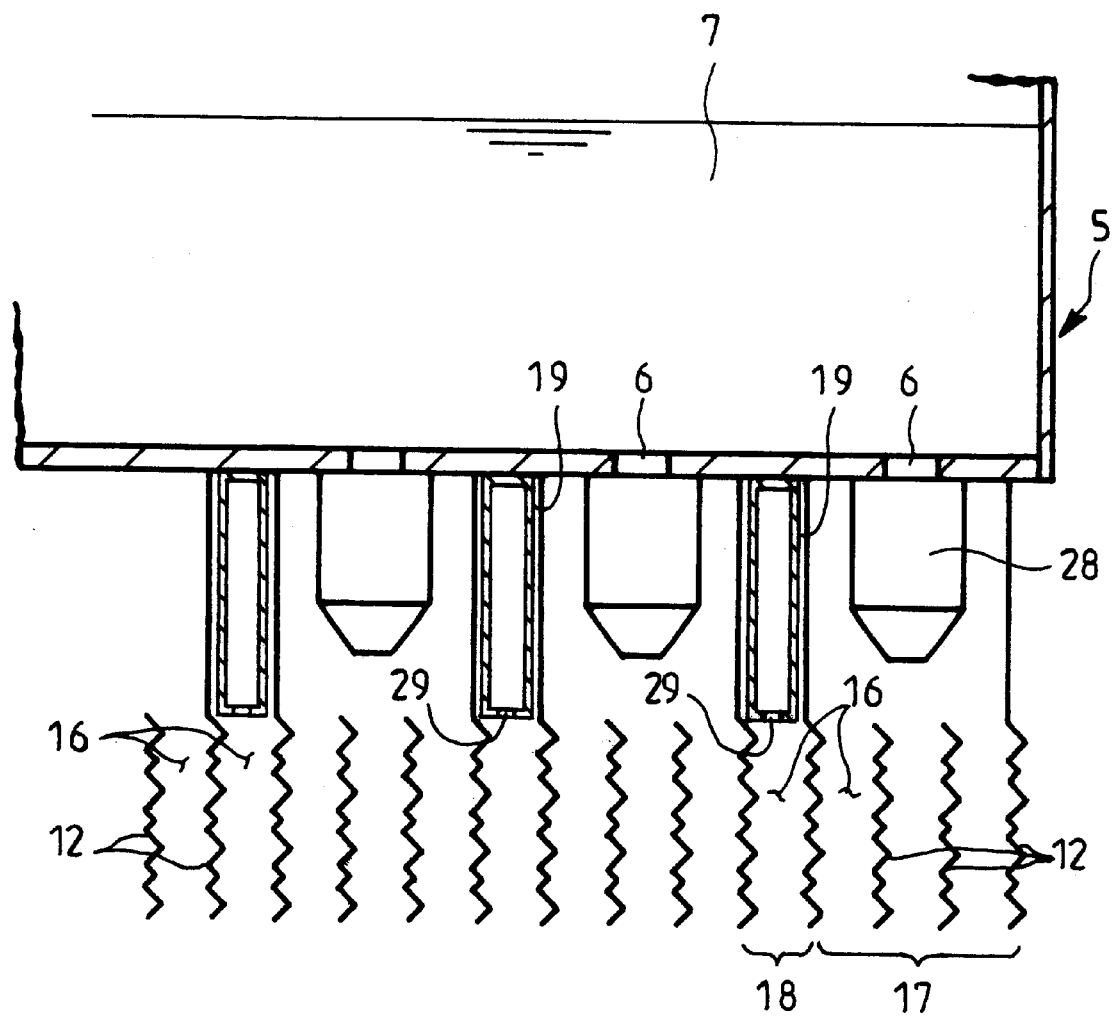
FIG. 2 is a front view of an embodiment of the present invention.

As shown in FIG. 2, the embodiment requires no special-purpose dry type air heater with finned tubes and has a heat exchanger which is arranged under a hot water vessel 5 and which comprises fillers 12 in the form of a number of heat transfer surface members with irregular surfaces, made of sheet-like synthetic resin and arranged in parallel with each other to define vertically extending flow passages 16 for ambient air 8. The fillers 12 are partitioned alternately into permanent wet and wet-dry changeover regions 17 and 18 which are mutually isolated for the flow passages 16 of the ambient air 8 (see FIG. 3).

Each of the permanent wet regions 17 comprises three rows of flow passages 16 and each of the wet-dry changeover regions 18, a row of flow passage 16. The fillers 12 which constitute the wet-dry changeover regions 18 extend at their upper ends upward along opposite side surfaces of spray pipes 19 each of which in turn has vertically elongate rectangular cross-section and is arranged on a lower surface of the hot water vessel 5 so as to prevent intrusion of hot water 7 from the adjacent permanent wet regions 17.

Figure 3:
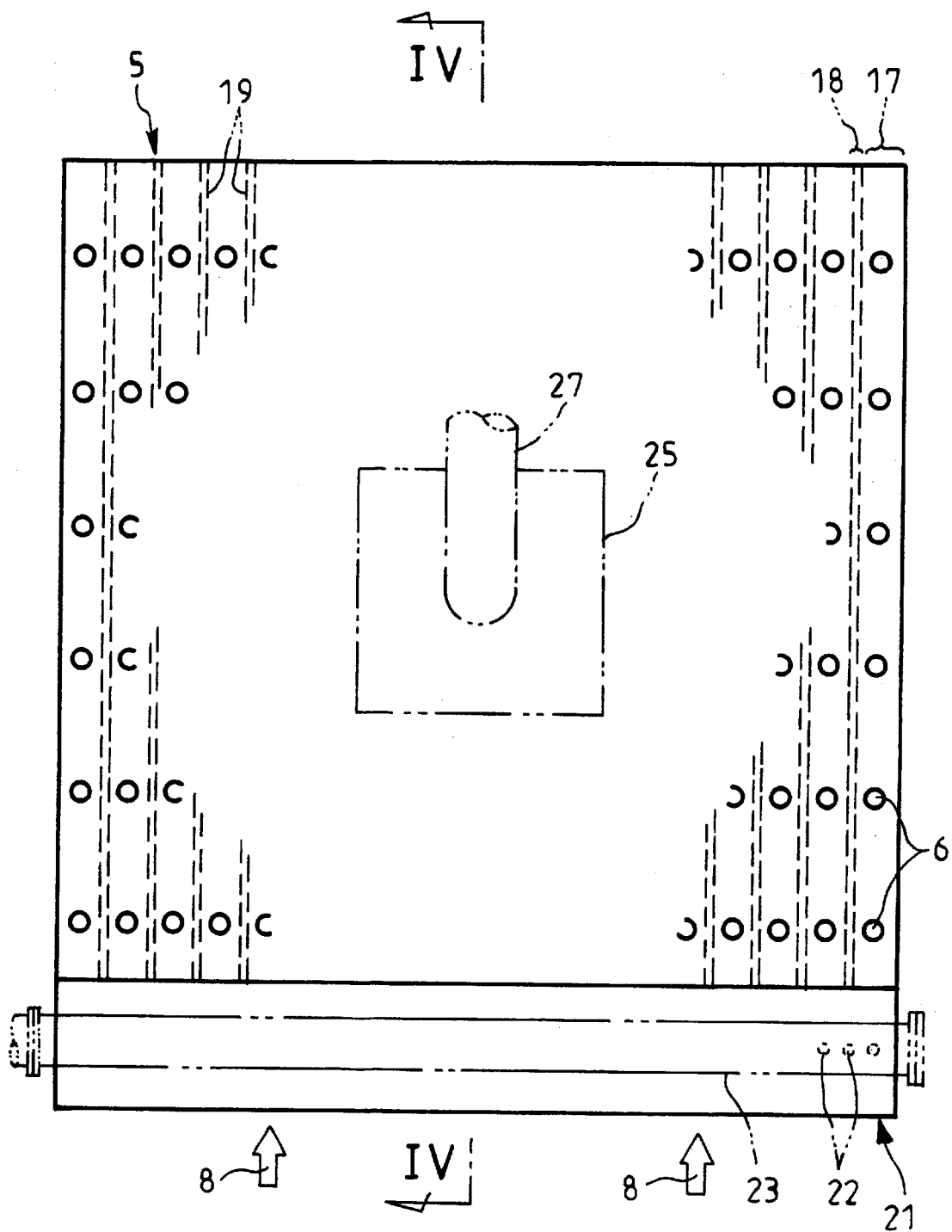
FIG. 3 is a plan view of a hot water vessel shown in FIG. 2.

As shown in FIG. 3, the spray pipes 19 are arranged on the lower surface of the hot water vessel 5 to correspond to respective rows of the wet-dry changeover regions 18 so that water may be sprayed in the wet-dry changeover regions 18 separately from the permanent wet regions 17. On the other hand, spray ports 6 of the hot water vessel 5 are communicated only with the permanent wet regions 17.

Figure 4:
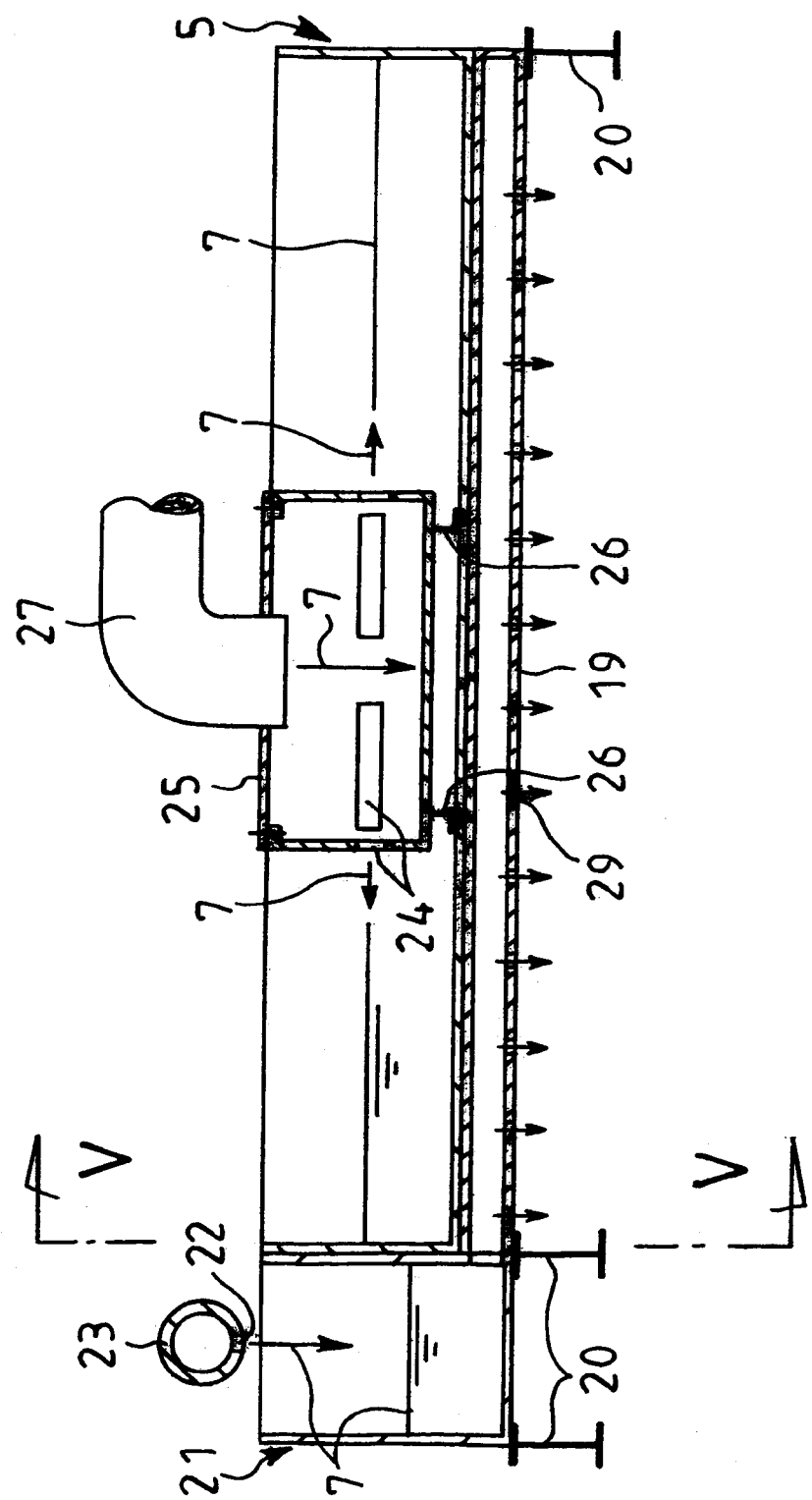
FIG. 4 is a view looking in the direction of arrows IV—IV in FIG. 3.
Figure 5:
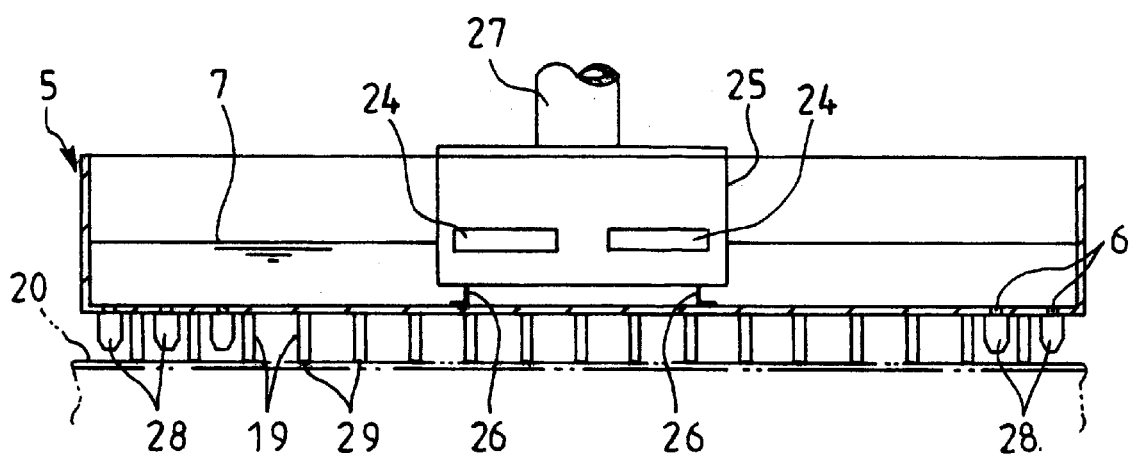
FIG. 5 is a view looking in the direction of arrows V—V in FIG. 4.

As shown in FIGS. 4 and 5, the hot water vessel 5 is directly placed on the spray pipes 19 each of which in turn is fixed at its longitudinal ends to a main structure 20 of the cooling tower.

The spray pipes 19 are communicated with a common auxiliary water vessel 21 which is arranged adjacent to the hot water vessel 5 and extends transversely of the spray pipes 19. Arranged above the auxiliary water vessel 21 is a water supply header 23 which extends along the vessel 21 and has a plurality of water supply holes 22 on its bottom substantially over the whole length of the header 23. The hot water 7 to the header 23 is substantially evenly supplied to a plurality of locations longitudinally in the auxiliary water vessel 21.

A distribution box 25 having slit-like openings 24 on all of its four sides and a water supply pipe 27 on its upper surface is installed substantially centrally of the hot water vessel 5 and in an elevated-floor manner using angle members 26 so as not to block the spray ports 6 on the lower surface of the vessel 5. The hot water 7 supplied through the pipe 27 to the distribution box 25 is temporarily pooled in the box 25 so that the water is slowly and evenly distributed with reduced flow velocity and passed in all directions through the openings 24 on its sides.

Further, in the embodiment, spray nozzles 28 are provided for the spray ports 6 on the lower surface of the hot water vessel 5. Provision of such spray nozzles 28 will facilitate satisfactory diffusion and spray of the hot water 7 to the fillers 12 in the permanent wet regions 17 each having three rows of flow passages 16. These nozzles 28 may, however, be omitted by adjusting mutual distance of the fillers 12, number, positions or diameter of the spray ports 6 or the like.

In the figures, reference numeral 29 denotes spray holes on the lower surface of the spray pipe 19 which are spaced apart from each other along the length of the spray pipe 19.

When there is no possibility of white smoke being generated (i.e., when ambient air temperature is high), the hot water 7 is introduced through the water supply pipe 27 into the distribution box 25 where the hot water 7 is temporarily pooled, so that the water can be slowly and evenly passed with reduced flow velocity through the openings 24 in all directions to thereby be supplied to the hot water vessel 5 such that adequate water level is maintained in the vessel 5. At the same time, the hot water 7 is substantially evenly sprayed through the water supply header 23 to a plurality of locations longitudinally in the auxiliary water vessel 21 such that adequate water level is maintained in the vessel 21, resulting in substantially even distribution of the hot water 7 through the vessel 21 to each of the spray pipes 19. As a result, the hot water 7 is sprayed through the spray ports on the lower surfaces of the hot water vessel 5 to the permanent wet regions 17 of the fillers 12 and is also sprayed through the spray pipes 19 to the wet-dry changeover regions 18 of the fillers 12, so that the hot water 7 is effectively cooled by the ambient air 8 over the entire area of the fillers 12 because of the water 7 being sprayed to both the permanent wet and wet-dry changeover regions 17 and 18.

On the other hand, when white smoke may be generated (i.e., when ambient air temperature is low), the supply of the hot water 7 to the spray pipes 19 is ceased into two concurrent operations, i.e. direct cooling of the hot water 7 by the ambient air 8 in the permanent wet regions 17 where the hot water 7 is sprayed and dry heating of the ambient air 8 passing through the wet-dry changeover regions 18 where no hot water is sprayed. The wet air generated by the direct cooling is mixed with the dry air produced by the dry heating to thereby prevent the white smoke from being generated.

Thus, there is no need of providing a special-purpose dry type air heater in the form of finned tubes since the fillers 12 are partly used as the wet-dry changeover regions 18. Also, there is no need of providing support members for the hot water vessel 5 since the vessel 5 is supported by the spray pipes 19.

According to the embodiment of the invention as described above, a cooling tower capable of preventing white smoke from being generated can be put into practice with the hot water vessel 5 and its support structure which are not complicated in structure and are of the same height and dimension as those of conventional cooling tower since there is no need of providing a special-purpose dry type air heater in the form of finned tubes because of the fillers 12 being partially used as the wet-dry changeover regions 18 and the spray pipes 19 which can serve as supports for the hot water vessel 5 are provided for independent spray of the water to the wet-dry changeover regions 18. Therefore, according to the invention, a cooling tower capable of preventing white smoke from being generated can be constructed with reduced cost and can be made compact in size.

According to the invention, no partitioning of the hot water vessel 5 by for example partition walls is required for independent spray of the water to the permanent wet and wet-dry changeover regions 17 and 18, respectively. Accordingly, water supply means for a conventional cooling tower having a permanent wet region as a whole may be utilized in the present invention without change; the distribution box 25 known per se as shown in the figures may be used to supply the hot water 7 into the hot water vessel 5 without any difficulty and in very satisfactory manner.

In the embodiment, the spray pipes 19 have vertically elongate rectangular cross-section, which facilitates easy application of the spray pipes 19 to the wet-dry changeover regions 18 which are normally narrow in width in comparison with the permanent wet regions 17. The feature is particularly advantageous in that the wet-dry changeover regions 18 are readily isolated from the permanent wet regions 17 by extending upper ends of the fillers 12 which define the wet-dry changeover regions 18 upward along opposite side surfaces of the spray pipes 19. Moreover, in utilization of the spray pipes 19 as supports for the hot water vessel 5, that feature increases structural strength of the supports against the load placed thereon and enhances reliability as the supports.

In the embodiment, the spray pipes 19 are communicated with a common auxiliary water vessel 21 which is arranged adjacent to the hot water vessel 5 and extends transversely of the spray pipes 19. This makes it possible to substantially evenly distribute the hot water 7 temporarily pooled in the auxiliary water vessel 21 to each of the spray pipes 19 all the way to the depth, so that the water 7 can be evenly and satisfactorily sprayed in the wet-dry changeover regions 18 of the fillers 12.

It is to be understood that the cooling tower of the present invention is not limited to the above embodiment and that various changes and modifications may be made without departing from the spirit and the scope of the present invention.

What is claimed is:

1. A cooling tower wherein hot water is sprayed to fillers arranged immediately under a hot water vessel through spray ports opened on a lower surface of the hot water vessel, the hot water flowing down along the fillers being cooled through direct contact with ambient air, said cooling tower comprising said fillers partitioned alternately into permanent wet and wet-dry changeover regions which are mutually isolated for flow passages of the ambient air and spray pipes provided on the lower surface of the hot water vessel exclusively for the wet-dry changeover regions such that the hot water can be sprayed to the wet-dry changeover regions separately from the permanent wet regions, said hot water vessel being supported by said spray pipes, the spray ports of the hot water vessel being communicated only with the permanent wet regions.

2. A cooling tower according to claim 1 wherein said spray pipes have vertically elongate rectangular cross-section.

3. A cooling tower according to claim 1 wherein said spray pipes are communicated with a common auxiliary water vessel which is arranged adjacent to the hot water vessel and extends transversely of the spray pipes.

4. A cooling tower according to claim 2 wherein said spray pipes are communicated with a common auxiliary water vessel which is arranged adjacent to the hot water vessel and extends transversely of the spray pipes.

* * * * *